UNITED STATES PATENT OFFICE.

HENRY A. CLARK, OF BOSTON, MASSACHUSETTS.

PROCESS OF DESULPHURIZING AND DEVULCANIZING WASTE VULCANIZED INDIA-RUBBER.

SPECIFICATION forming part of Letters Patent No. 236,778, dated January 18, 1881.

Application filed October 14, 1880. (No specimens.)

*To all whom it may concern:*

Be it known that I, HENRY A. CLARK, of Boston, in the county of Suffolk and State of Massachusetts, have invented certain new and useful Improvements in Process of Desulphurizing and Devulcanizing Waste Vulcanized India-Rubber, of which the following is a full, clear, and exact description.

This invention relates to the treatment of waste vulcanized india-rubber, caoutchouc, &c., to desulphurize and devulcanize it, and to thereby reduce it to a suitable condition to be worked over and revulcanized and applied to the various purposes and uses of india-rubber.

Under this invention the waste vulcanized india-rubber is reduced, by grinding or otherwise, to fine or small pieces. It is then placed in a steam-jacket kettle or other suitable chamber or receptacle and moistened or dampened with water, which dampness and moisture, under the heat of the kettle from the admission of steam to its jacket-chamber, is evaporated, and as so evaporated renewed from time to time. This operation is continued from one to two days, and when completed the material is allowed to dry and then moistened or dampened with turpentine, camphene, or other equivalent substance, after which heat is again applied in a sufficient degree to evaporate the turpentine or camphene, or other equivalent material, used to dampen or moisten the material, as described, which completes the operation. Moistening and dampening the material with water and then evaporating the water, as described, desulphurizes it to a greater or lesser extent, and, if desired, a small quantity of turpentine or camphene may be employed with the water. The after moistening and dampening of the material with turpentine, camphene, or equivalent material and then evaporating it completes the desulphurization and devulcanizes the material, and this treatment of the material with turpentine is continued until the material is reduced to a soft and plastic condition and one suitable for it to be worked over and used again in the various uses of india-rubber.

This mode of treatment herein described I deem to possess decided advantages over the mode and treatment described in another application for Letters Patent made by me for restoring waste vulcanized india-rubber, which application was allowed September 23, 1880, in this respect more particularly, that as the material is moistened and dampened with turpentine, when the turpentine is evaporated or heated its vapors are within and at once permeate the mass of the material, and thus act wholly, freely, and evenly upon it. This is not the case when the vapors are forced, or rather attempted to be forced, through the mass of material from the outside thereof, and oftentimes only the outer portions or parts of the material are affected by the vapors of the turpentine, leaving the inner portions unaffected to any advantageous or practical degree.

It is preferable in working this invention to use turpentine which has been refined or purified.

Having thus described my invention, what I claim, and desire to secure by Letters Patent, is—

In restoring waste vulcanized india-rubber, first moistening or dampening the material with water and evaporating such water, and then moistening and dampening the material with turpentine, camphene, or equivalent substance, and then heating or evaporating the turpentine, all substantially as herein described.

In testimony whereof I have hereunto set my hand in the presence of two subscribing witnesses.

HENRY A. CLARK.

Witnesses:
EDWIN W. BROWN,
WILLIAM S. BELLOWS.